(12) United States Patent
Nagarajan et al.

(10) Patent No.: US 12,391,838 B2
(45) Date of Patent: Aug. 19, 2025

(54) SYNERGISTIC FLAME RETARDANT COMPOSITIONS AND FIBER BLENDS INCLUDING THE SAME

(71) Applicants: THE UNIVERSITY OF MASSACHUSETTS, Boston, MA (US); The Government of the United States, As Represented By The Secretary of The Army, Natick, MA (US)

(72) Inventors: Ramaswamy Nagarajan, Westford, MA (US); Jayant Kumar, Westford, MA (US); Ravi Mosurkal, Lowell, MA (US); Zhiyu Xia, Shrewsbury, MA (US); Shiran Yu, Lowell, MA (US); Weeradech Kiratitanavit, Boston, MA (US)

(73) Assignees: US GOVERNMENT AS REPRESENTED BY THE SECRETARY OF THE ARMY, Natick, MA (US); THE UNIVERSITY OF MASSACHUSETTS, Boston, MA (US)

( * ) Notice: Subject to any disclaimer, the term of this patent is extended or adjusted under 35 U.S.C. 154(b) by 515 days.

(21) Appl. No.: 16/543,218

(22) Filed: Aug. 16, 2019

(65) Prior Publication Data

US 2020/0056057 A1    Feb. 20, 2020

Related U.S. Application Data

(60) Provisional application No. 62/719,581, filed on Aug. 17, 2018.

(51) Int. Cl.
*C09D 5/18* (2006.01)
*D06M 13/148* (2006.01)
*D06M 13/282* (2006.01)

(52) U.S. Cl.
CPC ............ *C09D 5/18* (2013.01); *D06M 13/148* (2013.01); *D06M 13/282* (2013.01); *D06M 2200/30* (2013.01)

(58) Field of Classification Search
CPC .... C09D 5/18; D06M 13/148; D06M 13/282; D06M 2200/30; D06M 13/288; C09K 21/12
(Continued)

(56) References Cited

U.S. PATENT DOCUMENTS

| 3,092,537 A * | 6/1963 | Brandts ................. C09K 21/08 162/207 |
| 4,842,611 A * | 6/1989 | Huffman ................ D06M 11/13 252/608 |

(Continued)

FOREIGN PATENT DOCUMENTS

WO    WO-2017156411 A1 *    9/2017    ............... C07G 1/00

OTHER PUBLICATIONS

CN 106476367 Derwent English Abstract (Year: 2017).*
(Continued)

*Primary Examiner* — Marla D McConnell
*Assistant Examiner* — Christine X Nisula
(74) *Attorney, Agent, or Firm* — CANTOR COLBURN LLP (57) ABSTRACT

A synergistic flame retardant composition comprising a phenolic compound comprising condensed tannin, hydrolysable tannin, lignin, cardanol, quercetin, catechin, epicatechin, anthocyanidin, catechol, dopamine, hydroxytyrosol, adrenaline, 4-hydroxyphenylacetic acid, gallic acid, digallic acid, methyl gallate, ellagic acid, phloroglucinol, hexahydroxydiphenic acid, luteic acid, casuarictin, or a combina-
(Continued)

Fabric residue after vertical flame test

Untreated Nylon 66 | Nylon 66 Tannic Acid | Nylon 66 Phytic Acid | Untreated Cotton | Cotton Phytic Acid | Cotton Tannic Acid | Untreated Nyco | TA/PA-treated Nyco tion thereof; and a phosphorus-containing compound comprising a $C_{5-7}$ carbocyclic polyol substituted with at least one phosphate group.

20 Claims, 2 Drawing Sheets

(58) Field of Classification Search
USPC .......................................................... 442/123
See application file for complete search history.

(56) References Cited

U.S. PATENT DOCUMENTS

| | | | | |
|---|---|---|---|---|
| 7,713,891 | B1* | 5/2010 | Li ..................... | D06M 13/2246 |
| | | | | 442/136 |
| 8,793,814 | B1* | 8/2014 | Dilanni ................ | D03D 13/004 |
| | | | | 2/97 |
| 2004/0082712 | A1* | 4/2004 | Blount ............... | C08G 18/3831 |
| | | | | 524/589 |
| 2006/0214142 | A1* | 9/2006 | Nikkeshi ................ | C09K 21/06 |
| | | | | 252/601 |
| 2015/0073071 | A1* | 3/2015 | Zammarano ............. | C09D 7/63 |
| | | | | 524/30 |
| 2016/0340517 | A1* | 11/2016 | Simpson .................. | C09D 5/18 |
| 2017/0130069 | A1* | 5/2017 | Sperber .................. | C09K 21/04 |
| 2018/0016445 | A1* | 1/2018 | Nagarajan .............. | C08G 63/81 |
| 2019/0077940 | A1* | 3/2019 | Deans ..................... | C08L 55/02 |
| 2019/0153663 | A1* | 5/2019 | Topalovic Jocic ... | A62B 17/003 |
| 2020/0062932 | A1* | 2/2020 | Labat ....................... | C09D 7/61 |

OTHER PUBLICATIONS

"A Plant-Based Reactive Ammonium Phytate for Use as a Flame-Retardant for Cotton Fabric." Carbohydrate polymers 175, (2017) 636-644 doi:10.1016/j.carbpol.2017.06.129.
"Durable Flame Retardant Cellulosic Fibers Modified with Novel, Facile and Efficient Phytic Acid-Based Finishing Agent." Cellulose (2018) 25:799-811 doi:10.1007/s10570-017-1550-0.
Xia et al., "Fire Resistant Polyphenols Based on Chemical Modification of Bio-Derived Tannic Acid," vol. 153, (Jul. 2018); Abstract; www.sciencedirect.com/science/article/pii/S0141391018301216?via%3Dihub.

* cited by examiner

Fabric residue after vertical flame test

SYNERGISTIC FLAME RETARDANT COMPOSITIONS AND FIBER BLENDS INCLUDING THE SAME

CROSS REFERENCE TO RELATED APPLICATION

This application claims the benefit of and priority to U.S. Provisional Patent Application No. 62/719,581 filed on Aug. 17, 2018, the entire content of which is incorporated by reference herein.

FEDERAL RESEARCH STATEMENT

This disclosure was made with government support under Grant No. W911-QY-17-2-0004, awarded by the CCDC SC. The government has certain rights in the disclosure.

BACKGROUND

Textiles are an essential part of everyday life and are found in draperies, clothes, furniture, vehicle upholsteries, toys, packaging material, and numerous other applications. Natural cotton fabric is used widely in clothes due to its low cost/large availability and comfort to wear. Highly engineered synthetic fabric is becoming popular and offers excellent combination of mechanical properties, abrasion resistance, and other unique properties. With combined advantages, the use of natural/synthetic fiber blends is increasingly common in apparel applications. However, the natural/synthetic fiber blends also bring unexpected challenges for the development of flame retardant coatings due to their burning behaviors. For nylon-cotton blends, "scaffold effect" can occur when the fiber blend catches fire, wherein the cotton fibers ignite easily and form char, the molten nylon is exposed to the flame supported by the char formation by cotton, and the nylon burns continuously. (1) The molten nylon can also adhere to the skin and cause severe burns. (2-3) This burning behavior renders it difficult to achieve flame resistance on such mixed synthetic and natural fiber-based fabrics.

Flame retardants used for the protection of textiles should be environmentally safe, compatible with fabric, capable of preserving the aesthetical and textural properties of the fabric, and resistant to extensive washing and cleaning (generally termed as "durable"). Above all, a flame retardant agent suitable for textile treatment should pass the standard flammability tests in the field, preferably even after washing cycles.

Accordingly, there remains a need for flame retardants in textiles having blends of natural fibers and synthetic fibers.

BRIEF DESCRIPTION

Provided is a synergistic flame retardant composition comprising a phenolic compound comprising condensed tannin, hydrolysable tannin, lignin, cardanol, quercetin, catechin, epicatechin, anthocyanidin, catechol, dopamine, hydroxytyrosol, adrenaline, 4-hydroxyphenylacetic acid, gallic acid, digallic acid, methyl gallate, ellagic acid, phloroglucinol, hexahydroxydiphenic acid, luteic acid, casuarictin, or a combination thereof; and a phosphorus-containing compound comprising a $C_{5-7}$ carbocyclic polyol substituted with at least one phosphate group.

Also provided is a flame resistant textile comprising a fiber blend comprising a natural fiber and a synthetic fiber; and the flame retardant composition.

A method for the manufacture of the flame resistant textile comprises contacting the fiber blend and the flame retardant composition under conditions effective to provide the flame resistant textile.

The above described and other features are exemplified by the following figures and detailed description.

BRIEF DESCRIPTION OF THE DRAWINGS

The following figures are exemplary embodiments.

DETAILED DESCRIPTION

The present inventors have surprisingly discovered that a flame retardant composition including a phenolic compound and a phosphorus-containing compound can be applied to a textile to achieve synergistic improvement in flame resistance properties that exceed those predicted based on the additive effects of each of the phenolic compound and phosphorus-containing compound alone. Remarkably, the compositions provide the flame resistance properties to textiles at lower add-on weights than would be expected based on similar flame retardant compositions, which results in an improved flame-resistance to weight ratio of the coated textile.

The flame retardant composition includes a phenolic compound and a phosphorous containing compound. The phenolic compound has one or more aromatic hydroxy groups (i.e., phenol groups). For example, the phenolic compound can have 1, 2, 3, 4, 5, 6, or more phenol groups. Larger numbers of phenol groups can be present in compounds having multiple ring systems, for example up to 50 phenolic hydroxyl groups. For example, the phenolic compound can be a macromolecule including 10, 15, 20, 25, 30 or more phenolic groups. In some embodiments, the phenolic compound can include 1 to 100, or 2 to 50, or 1 to 30, or 2 to 30, or 1 to 10, or 2 to 10, or 1 to 5, or 2 to 5 phenol groups.

Exemplary phenolic compounds include, but are not limited to, condensed tannin, hydrolysable tannin, lignin, cardanol, quercetin, catechin, epicatechin, anthocyanidin, catechol, dopamine, hydroxytyrosol, adrenaline, 4-hydroxyphenylacetic acid, gallic acid, digallic acid, methyl gallate, ellagic acid, phloroglucinol, hexahydroxydiphenic acid, luteic acid, casuarictin, or a combination thereof. It is to be understood that for each of these phenolic compounds a derivative thereof can be used; for example, a condensed tannin includes derivatives thereof, a lignin includes derivatives thereof, and the like. The phenolic compound can also refer to a mixture of phenolic compounds, for example tannic acid having a mixture of gallotannins with an average of ten galloyl units.

The phenolic compound can be a natural product, i.e., a product that is found in or derived from a natural source, such as a plant or animal source, or can be a synthetic compound derived from fossil fuel-based resources. Some bio-based phenols that are natural products can be obtained directly from the natural source, or from other processes such as fermentation. Some phenolic compound, such as gallic acid, are found in natural sources, but can be chemically synthesized from other feedstocks. In a preferred embodiment, the phenolic compound is a natural product derived from a natural source, such as a plant. The phenolic compounds can be used as isolated from the natural source, or further modified, for example hydrolyzed or partially derivatized.

The phenolic compound can be a tannin. There are two major classes of tannins: condensed tannins and hydrolysable tannins. Hydrolysable tannins have a less conjugated structure, higher solubility in most organic solvents, and a lighter color. The phenolic compound can be a condensed tannin such as proanthocyanidin, polyflavonoid tannin, catechol-type tannin, pyrocatechol-type tannin, flavolan, or a combination thereof; a hydrolysable tannin such as ellagitannin, gallotannin, tannic acid, or a combination thereof.

In a preferred embodiment, the phenolic compound is tannic acid. Tannic acid has up to twelve galloyl (1,2,3-benzene triol) units covalently attached to a glucose core through ester linkages. The commercially available tannic acid ($C_{76}H_{52}O_{46}$) is usually a mixture of different gallotannins with an average of ten galloyl units attached to the glucose core as shown in formula (1).

(1)

The phenolic compound can be a lignin, such as kraft lignin, lignosulfonate, organosolv lignin, hydrolysis lignin, a soda lignin, or a combination thereof. Lignins generally have hydroxyl, phenolic, and/or carboxylic acid functionality. The level of each functionality in a lignin depends on the bio-mass and the process conditions used to separate the lignin from cellulose and hemicelluloses in the biomass. Minor amounts of ash, cellulose and hemicelluloses are usually present in a lignin. Kraft, lignosulfonates, and soda lignins are prepared in commercial quantities from hardwoods, softwoods, and grasses (e.g., rice straw, wheat straw, hemp, bagasse, or the like) under basic conditions. Other biomasses used to produce lignins include corn stover, switch grass, municipal waste streams, and the like. Organosolv lignins are prepared in solvent mixtures that can include ethanol and water and are generally acidic. Hydrolysis lignins are prepared under neutral or acidic conditions. Processing steps to help break down the biomass to produce lignins include steam explosion, cooking in water at temperatures that can exceed 100° C., exposure to supercritical water, supercritical carbon dioxide or other substances, and microbial and enzyme treatments. The lignin can have a number average molecular weight from about 500 to 30,000 grams per mole.

The phosphorous-containing compound includes a $C_{5-7}$ carbocyclic polyol substituted with at least one phosphate group. The $C_{5-7}$ carbocyclic polyol can include 2 to 14 hydroxy groups, provided at least one of the hydroxy groups is substituted with a phosphate group. Exemplary phosphorous-containing compounds include, but are not limited to, inositol phosphate, inositol diphosphate, inositol triphosphate, inositol tetraphosphate, inositol pentaphosphate, phytic acid, a salt thereof, or a combination thereof. For example, the phosphorous-containing compound can be sodium, potassium, magnesium, calcium, ammonium, or sulfonium salt of the phosphorous-containing compound. As used herein, the phosphate group is of the formula —O—P(=O)(OH)$_2$ wherein one or more of the hydroxyl groups can be an acid salt (e.g., O-M wherein M is a cation). In a preferred embodiment, the phosphorous-containing compound includes phytic acid.

The phosphoric acid group or inorganic phosphate ion can undergo phosphorylation reaction with the hydroxyl groups on cellulose. Other acid forms or inorganic salts of organophosphonate, organophosphinate, organophosphorus compounds containing sulfur or nitrogen elements (such as thiophosphate, thiophosphonate, thiophosphinate, phosphoramide, and phosphonamide), organosulfur compounds (such as sulfate, sulfonate, sulfite, sulfamate, and sulfonamide) can undergo similar esterification reaction with a cellulosic hydroxyl group and provide reasonable flame resistance to cellulosic fabric.

The flame retardant composition can further include an additional phosphorous-containing compound. Exemplary compounds include, but are not limited to, phosphazene, phosphonitrilic chloride, phosphorus ester amide, phosphoric acid amide, phosphonic acid amide, phosphinic acid amide, thiophosphate, thiophosphonate, thiophosphinate, phosphine oxide, resorcinol bis(diphenyl phosphate), phenyl bis(dodecyl) phosphate, phenyl bis(neopentyl) phosphate, phenyl bis(3,5,5'-trimethylhexyl) phosphate, ethyl diphenyl phosphate, 2-ethylhexyl di(p-tolyl) phosphate, bis(2-ethylhexyl) p-tolyl phosphate, tritolyl phosphate, bis(2-ethylhexyl) phenyl phosphate, tri(nonylphenyl) phosphate, bis(dodecyl) p-tolyl phosphate, dibutyl phenyl phosphate, 2-chloroethyl diphenyl phosphate, p-tolyl bis(2,5,5'-trimethylhexyl) phosphate, 2-ethylhexyl diphenyl phosphate, phosphoric acid, ammonium dihydrogen phosphate, ammonium phosphate, triphosphoric acid, polyphosphoric acid, ammonium polyphosphate, vinyl phosphoric acid, polyvinyl phosphoric acid, vinyl phosphonic acid, polyvinyl phosphonic acid, dimethyl phosphate, diethylphosphinic acid, o-ethyl hydrogen methylphosphonothioate, amifostine, glyphosate, zoledronic acid, or a combination thereof.

The phenolic compound and the phosphorous-containing compound can present in the composition at a ratio that is effective to provide flame retardance to a coated textile. For example, the phenolic compound and the phosphorous-containing compound can be present in the composition in a ratio of 1:10 to 10:1, or 1:5 to 5:1, or 1:2 to 2:1 by weight.

The flame retardant composition can further include a surfactant, a crosslinker such as urea or a derivative thereof, a solvent, or a combination thereof. Preferably, the flame retardant composition includes a surfactant, urea, and water.

The surfactant may act as a detergent, wetting agent, emulsifier, foaming agent, dispersant, adsorbent, or the like. Exemplary surfactants include a non-ionic surfactant, an anionic surfactant, a cationic surfactant, an amphoteric surfactant, or a combination comprising at least one of the foregoing. For example, the surfactant can be alkylbenzene sulfonates; polyalkylene glycols, sulfates, sulfonates, and phosphate esters; carboxylates, ethoxylates, fatty acid esters of polyhydroxy compounds; amine oxides; sulfoxides; phosphine oxides; polysorbates; sodium phosphates; sodium stearoyl lactylate; sodium lauryl sulfate; or the like, or a combination thereof. In an embodiment, the surfactant is sodium lauryl sulfate. The surfactant can be used in an amount of 0.1 to 20 wt %, preferably 0.5 to 15 wt % based on the total weight of the flame retardant composition.

Compounds can be added to the composition to modify its color, fluidity, pH, or the like. Non-limiting additives include a surface active agent, an antifoaming agent, a preservative, a stabilizing agent, a binding agent, a thickening agent, a wetting agent, a suspending agent, a pH buffer, an anti-creasing agent, a sequestering agent, a detergent, a dye, a pigment, or the like. The additives can be used alone or in any combination.

Also provided is a flame resistant textile including a fiber blend having a natural fiber and a synthetic fiber, and the flame retardant composition described herein. As used herein, a "fiber" refers to a filament, fabric, rope, or yarn. For example, the fiber can be a monofilament fiber, a multifilament fiber, or a combination thereof. For example, the fiber can be in the form of a woven fabric, a nonwoven fabric, a knitted fabric, a crocheted fabric, a knotted fabric, an embroidered fabric, a twisted rope, a knitted rope, a braided rope, a crocheted rope, or knotted rope. The fiber can have any size, shape, denier, or combination thereof.

The natural fiber and synthetic fiber can be used in the fiber blend in any ratio. For example, the ratio of natural fiber to synthetic fiber can be 0.1:99.9 to 99.9:0.1, or 1:99 to 99:1, or 1:50 to 50:1, or 1:10 to 10:1, or 1:5 to 5:1, or 1:2 to 2:1, preferably 1:1.8 to 1.8:1, more preferably 1:1.5 to 1.5:1, even more preferably 1:1.3 to 1.3:1 by weight.

The natural fiber can be cotton, wool, silk, cellulose, regenerated cellulose (such as viscose and rayon), or a combination thereof. In a preferred embodiment, the natural fiber is cotton. Cellulose fibers include kenaf, hemp, flax, ramie, pineapple, coir, or the like, but are not limited thereto.

The synthetic fiber can be polyamide, polyester, polyurethane, poly(urea ether), polyolefin, polyacrylic, or a combination thereof. Polyamides include, for example, aliphatic polyamides, polyphthalamides, and polyaramides including synthetic linear polyamides, e.g., Nylon-6,6; Nylon-6,9; Nylon-6,10; Nylon-6,12; Nylon-11; Nylon-12 and Nylon-4,6, preferably Nylon 6 and Nylon 6,6. In a preferred embodiment, the synthetic fiber is a polyamide, for example Nylon 6,6. Polyesters include, for example, polyethylene terephthalates and polybutylene terephthalates. Polyurethanes include, for example, the polycondensation reaction products of linear alkyl/aromatic diisocyanate (such as hexamethylene diisocyanate) and linear alkyl/aromatic diol (1,4-butanediol). Poly(urea ether) includes fibers such as SPANDEX, LYCRA, elastane, or the like.

Exemplary polyolefins include, but are not limited to, polyethylene, polypropylene, polybutylene, polymethylpentene (and co-polymers thereof), polynorbornene (and co-polymers thereof), poly 1-butene, poly(3-methylbutene), poly(4-methylpentene) and copolymers of ethylene with propylene, 1-butene, 1-hexene, 1-octene, 1-decene, 4-methyl-1-pentene and 1-octadecene. Representative combinations of polyolefins are combinations including polyethylene and polypropylene, low-density polyethylene and high-density polyethylene, and polyethylene and olefin copolymers derived further including units derived from copolymerizable ethylenically unsaturated monomers, e.g., ethylene and acrylic acid copolymers; ethyl and methyl acrylate copolymers; ethylene and ethyl acrylate copolymers; ethylene and vinyl acetate copolymers, ethylene, acrylic acid, and ethyl acrylate copolymers, and ethylene, acrylic acid, and vinyl acetate copolymers.

In a preferred embodiment, the natural fiber is cotton and the synthetic fiber is a polyamide. For example, the fiber blend can be blend of nylon and cotton.

The flame retardant compound can be included in the flame resistant textile in any amount. For example, the amount of the flame retardant compound of the flame resistant textile can be less than about 20 wt %, based on the total weight of the textile. For example, the amount of the flame retardant compound can be 0.1 to less than 20 wt %, or 0.5 to 15 wt %, or 1 to 10 wt %, or 1 to 5 wt %, based on the total weight of the textile.

The phenolic compound can be bonded to the natural fiber, the synthetic fiber, or both through hydrogen bonding, ionic bonding, and/or covalent bonding. The phosphorus containing compound can be covalently bonded to the natural fiber, the synthetic fiber, or both. In an embodiment, the phenolic compound is bonded to the synthetic fiber and the phosphorous-containing compound is covalently bonded to the natural fiber. Covalent bonding between the flame retardant composition and the fibers of the fiber blend is preferred, since this type of bonding can better resist hydrolysis that can occur in alkaline laundering conditions. Fabric surface finishing or protective polymer coating layers can also be applied to the flame resistant textile to preserve the flame retardant composition on the textile. Exemplary surface finishing compounds, such as phenolic resin, melamine, and formaldehyde, can be used as additives to extend the crosslinking of the phenolic compound and phosphorous-containing compound. The flame retardant composition can further include elastomeric polymers that are dissolved in organic solvents to provide the textile with additional beneficial properties and can minimize direct contact between the flame retardant composition and hydrolyzing agents.

In an embodiment, the phosphorus-containing compound is covalently bonded to the natural fiber by phosphorylation in the presence of an amino compound, wherein the amino compound includes urea, dicyandiamide, ethylene diamine, or a combination thereof.

The flame retardant textiles can further include one or more additives, including polymer additives, which can provide heat absorption and/or heat reflectivity properties. Non-limiting examples of thermally conductive additives which may be used in some embodiments described herein include ceramics such as aluminum nitride or boron nitride ceramics, metals such as aluminum or copper, and nanoscale carbon materials such as carbon fibers, carbon nanotubes, graphite nanoplatelets, or the like. Additives including thermochromic or photochromic pigment and dye materials may also be used. Such pigment and dye materials can change color in response to heat or light. One or more antimicrobial or antifungal materials can be included. Non-limiting examples of antimicrobial or antifungal materials include inorganic, organic, or metal-containing antimicrobial materials such as materials comprising silver, copper, and/or zinc, and quaternary silane-based antimicrobial materials.

The flame resistant textiles have excellent physical properties, including a heat release capacity (HRC) of less than or equal to 250 joules per gram-Kelvin (J/g-K), for example less than or equal to 240 J/g-K, or less than or equal to 230 J/g-K, or less than or equal to 220 J/g-K, or less than or equal to 210 J/g-K, or less than or equal to 200 J/g-K, as determined by pyrolysis combustion flow calorimetry (PCFC). PCFC is a tool for assessing the flammability of a polymer composition, as described in R. E. Lyon and R. N. Walters, "Pyrolysis combustion flow calorimetry", *Journal of Applied Pyrolysis*, 2004, volume 71, pages 27-46. PCFC is also known as microscale combustion calorimetry. HRC can be measured according to ASTM D7309.

The flame resistant textile can have a total heat release (THR) of less than or equal to 15 kilojoules per gram (kJ/g), for example less than or equal to 14 kJ/g, or less than or equal to 13 kJ/g, or less than or equal to 12 kJ/g, or less than or equal to 11 kJ/g, or less than or equal to 10 kJ/g, as determined by pyrolysis combustion flow calorimetry (PCFC). THR can be measured according to ASTM D7309.

The flame resistant textile can have a peak heat release rate (PHRR) of less than or equal to 120 kilowatts per square meter ($kW/m^2$), as determined by cone calorimetry. For example, the PHRR can be less than or equal to 115 $kW/m^2$, or less than or equal to 110 $kW/m^2$, or less than or equal to 105 $kW/m^2$.

The flame resistant textile can have a total heat release rate (THRR) of less than or equal to 3.5 megajoules per square meter ($MJ/m^2$), as determined by cone calorimetry. For example, the THRR can be less than or equal to 3.3 $MJ/m^2$, or less than or equal to 3.1 $MJ/m^2$, or less than or equal to 3 $MJ/m^2$.

The flame resistant textile can have a phosphorous content of 3% or less by weight, preferably 2.9% or less by weight, based on the total weight of the textile. The phosphorous content can be determined by inductively coupled plasma atomic emission spectroscopy.

The flame resistant textile can have a char yield of greater than or equal to 5 wt %, for example 5 to 50 wt %, or 5 to 40 wt %, or 5 to 25 wt %, based on the total weight of the textile, as determined by thermal gravimetric analysis under air at 750° C. The textile can have a char yield of greater than or equal to 10 wt %, for example 10 to 50 wt %, or 15 to 50 wt %, or 20 to 50 wt %, based on the total weight of the textile, as determined by thermal gravimetric analysis under nitrogen at 750° C.

The flame resistant textile can have a char length of less than 20 cm, for example less than 15 cm, or less than 12 cm, or less than 10 cm, or less than 9 cm, or less than 8 cm, as measured by a vertical flame test in accordance with ASTM D6143.

The flame resistant textile can have an after flame time of less than 18 seconds (s), or less than 12 s, or less than 8 s, or less than 4 s, or less than 2 s, as measured by a vertical flame test in accordance with ASTM D6143.

The flame resistant textile can be prepared using any method. For example, the flame retardant composition can be applied to the fiber blend by brush coating, roller coating, blade coating, or spray coating. The spray coating includes, for example, hot spray coating, air spray coating, airless spray coating, air-mix-assistant spray coating, high-volume low-pressure spray coating, low-volume medium-pressure spray coating, or the like.

In an embodiment, flame resistant textile is manufactured by contacting the fiber blend and the flame retardant composition under any conditions effective to provide the flame resistant textile. The contacting can be performed, for example, by spreading, coating, padding, dipping, printing, foaming, or spraying the flame retardant composition, or component thereof, onto the fiber blend. For example, the fiber blend and the phenolic compound can be contacted to form a first coated textile, and the first coated textile and the phosphorous-containing compound can be contacted to provide the flame resistant textile. Alternatively, the fiber blend and the phosphorous-containing compound can be contacted to form a first coated textile, and the first coated textile and the phenolic compound can be contacted to provide the flame resistant textile. After contacting the fiber blend and the flame retardant composition, or the components thereof, the resulting coated fiber blend can be cured to form the flame resistant textile. Any method of curing can be used, for example by heating or exposure to irradiation at suitable wavelengths.

In an embodiment, the fiber blend can be contacted with a first aqueous solution including the phenolic compound and heated to form the first coated textile, for example by heating at 50 to 200° C. or 75 to 150° C. for 10 minutes to 4 hours or 30 minutes to 2 hours. In some embodiments, the first aqueous solution of the phenolic compound further comprises an organic acid, preferably acetic acid, formic acid, or propionic acid. In some embodiments, the first aqueous solution further includes a surfactant. The first coated textile can be contacted with a second aqueous solution comprising the phosphorous-containing compound, and optionally urea, to provide crude textile, and the crude textile is cured at 100 to 250° C. for 10 minutes to 2 hours.

Also provided is an article including the flame resistant textile, preferably wherein the article is a drapery, garment, linen, mattress, carpet, tent, sleeping bag, toy, decorative fabric, upholstery, wall fabric, or technical textile, or fiber-reinforced composites.

This disclosure is further illustrated by the following examples, which are non-limiting.

EXAMPLES

The components in Table 1 are used in the examples. All the chemicals were used as received if not mentioned elsewhere.

TABLE 1

| Name | Description | Source |
| --- | --- | --- |
| TA | Tannic acid | Sigma Aldrich |
| PA | Phytic acid | Sigma Aldrich |
| SLS | Sodium lauryl sulfate | Sigma Aldrich |
| Fabric | Nylon-cotton fabric, 50 wt % cotton and 50 wt % Nylon 66, available as Nyco | US Army |
| Urea | Urea | Sigma Aldrich |
| Nylon 6,6 | Poly[imino(1,6-dioxohexamethylene) iminohexamethylene] | US Army |
| Cotton | 100% woven cotton fabric | Robert Kaufman Co Inc |

Physical Measurements

Physical measurements were made using the tests and test methods described below. Unless indicated otherwise, all tests are the tests in effect in the year 2010.

A TGA Q50 (TA Instruments) was used to characterize the thermal properties of the textile samples. The sample was heated at a rate of 20° C./min from room temperature to 800° C. under air or nitrogen.

The heat release characteristics of textile samples were evaluated by pyrolysis combustion flow calorimetry (PCFC) in accordance with ASTM D7309 using a micro-scale combustion calorimeter (available from Fire Testing Technology Inc.). A fabric sample (3-5 mg) was heated from 80 to 750° C. at a heating rate of 1° C./second under a nitrogen purge at a flow rate of 80 milliliters per minute (mL/min). The resulting decomposition products were transferred into a combustion chamber under a combined flow of 80 mL/min of nitrogen and 20 mL/min of oxygen, and then the decomposition products were fully oxidized at 900° C.

The oxygen consumption during the final oxidation heating was continuously measured to provide a plot of heat release rate (HRR, normalized by weight) versus temperature. Total heat release (THR, kilojoules per gram, kJ/g) was calculated from the area under the HRR-temperature curve. Heat release capacity (HRC, joules per gram degree Kelvin, J/g-K) corresponds to the maximum heat release per unit of mass per degree of temperature and is an indicator of flammability for polymer materials. Materials that have HRC of less than 200 J/g-K are commonly self-extinguishing in a vertical flame test (UL-94).

Peak heat release rate (PHRR, $kW/m^2$), time to PHRR (seconds), total heat release rate (THHR, $MJ/m^2$), and total smoke release (TSR, $m^2/m^2$) were determined by cone calorimetry in accordance with ASTM E1354.

Vertical flame test to determine char length (inches) and after burn time (seconds) were performed in accordance with ASTM D6413.

Laundry cycles were performed, for example, according to AATCC135.

Tensile properties were determined according to ASTM D5034. Force at break refers to the break strength (breaking force) and is reported in pounds (lbs.). Elongation at break is the extension at break in inches.

Treatment of Nyco Fabric with Tannic Acid (TA) and Phytic Acid (PA)

A tannic acid solution was prepared by combining tannic acid (0.6 g), sodium lauryl sulfate (40 mg), acetic acid (3 mL), and deionized water (200 mL). Separately, a fabric sample (Nyco fiber, having a length of 13.97 cm and a width of 5.08 cm) was pre-conditioned in an aqueous solution of sodium lauryl sulfate (40 mg) and deionized water (200 mL) at 40° C. for 30 minutes, removed from the aqueous solution, and the residual water was squeezed from the pre-conditioned fabric. The pre-conditioned fabric sample was submerged in the tannic acid solution (pre-heated at 40° C.), the temperature was raised to 100° C. at a heating rate of 1° C./minute, and was then held at 100° C. for 1 hour. The resulting TA-treated fabric sample was removed from the tannic acid solution, cooled to ambient temperature (ca. 23° C.), and then washed with deionized water (3×200 mL) at 60° C. The TA-treated fabric sample was subsequently dried in an oven at 70° C. for 12 hours.

A phytic acid solution was prepared by combining phytic acid (2 mL of a 50 wt % solution in water), urea (4.8 g), and deionized water (8 mL). The TA-treated fabric sample was briefly immersed in the phytic acid solution, dried at ambient temperature (ca. 23° C.) for 30 minutes, and further dried in an oven at 70° C. for 30 minutes. The resulting treated fabric was then heated at 155° C. for 45 minutes to provide a cured fabric. The cured fabric was washed with deionized water at 60° C. for 20 minutes (×2), dried at ambient temperature (ca. 23° C.) for 2 hours, and then dried in an oven at 70° C. for 12 hours. The weight of the cured fabric increased by about 8% relative to the weight of the initial fabric sample.

The phosphorous content of the cured fabric was 2.87 wt % as determined by inductively coupled plasma optical emission spectrometry (ICP-OES). For comparison, the phosphorous content of the untreated fabric was 0%.

Figure 1:
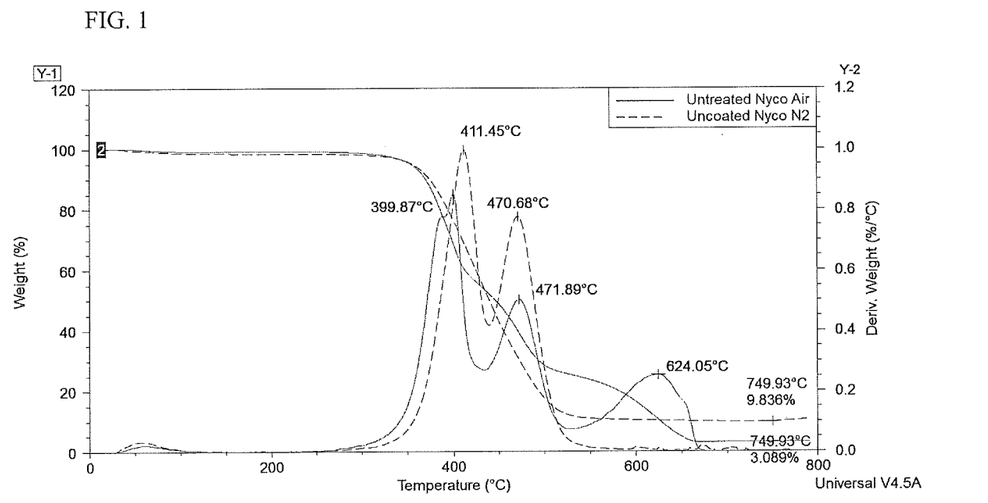
FIG. 1 is a graph of weight percent (and derivative weight percent) versus temperature (° C.) according to one or more aspects described herein.
Figure 2:
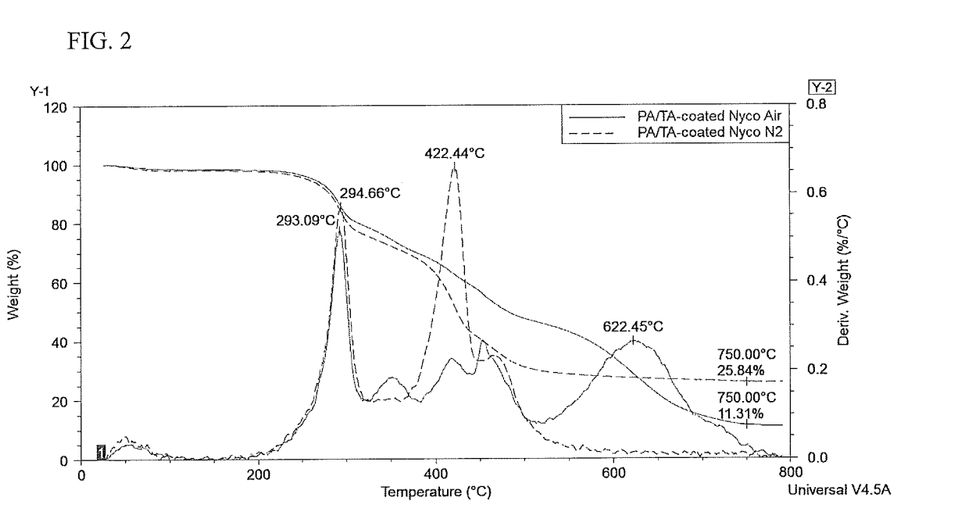
FIG. 2 is a graph of weight percent (and derivative weight percent) versus temperature (° C.) according to one or more aspects described herein.

The results of thermogravimetric analysis (TGA) and first derivative thermogravimetric analysis (DTG) performed on the untreated fabric samples in air (solid line) and nitrogen (dashed line) are shown in FIG. 1. The results of TGA and DTG performed on the cured fabric samples in air (solid line) and nitrogen (dashed line) are shown in FIG. 2. These results demonstrate the cured fabric samples have reduced weight loss at higher temperatures in both air and nitrogen as compared to the untreated fabric samples.

Table 2 shows the heat release characteristics of the TA-treated fabric, PA-treated fabric, the cured fabric, and the untreated fabric as determined by pyrolysis combustion flow calorimetry.

TABLE 2

| Sample | HRC (J/g-K) | THR (kJ/g) |
|---|---|---|
| Untreated fabric | 318 | 18.4 |
| TA-treated fabric | 237 | 15.9 |
| PA-treated fabric* | 231 | 11.9 |
| Cured fabric | 200 | 10.3 |

*prepared from the untreated fabric.

These results show the cured fabric has a decreased HRC and THR that surprisingly exceed the expected improvements from a combination of TA and PA. The results demonstrate a synergistic effect that exceeds the additive effects of TA treatment and PA treatment when combined.

Table 3 shows the flammability characteristics of TA-treated, PA-treated, and untreated samples of Nylon 66 and cotton, TA-treated fabric, PA-treated fabric, and the cured fabric. The untreated Nylon 66 and untreated cotton were used to prepare corresponding TA- and PA-treated samples following the same procedures as described above for the TA-treated and PA-treated fabrics, respectively.

TABLE 3

| Sample | PHHR ($kW/m^2$) | Time to PHRR (s) | THHR ($MJ/m^2$) | TSR ($m^2/m^2$) |
|---|---|---|---|---|
| Untreated Nylon 66 | 172 | 98 | 7.5 | 74 |
| TA-treated Nylon 66 | 178 | 84 | 7.1 | 77 |
| PA-treated Nylon 66 | 224 | 24 | 7.6 | 62 |
| Untreated cotton | 126 | 44 | 4.6 | 1 |
| TA-treated cotton | 138 | 37 | 4.8 | 3 |
| PA-treated cotton | 19 | 95 | 3.3 | 19 |
| Untreated fabric | 142 | 40 | 4.0 | 25 |
| TA-treated fabric | 137 | 33 | 4.1 | 28 |
| PA-treated fabric | 121 | 32 | 2.7 | 33 |
| Cured fabric | 108 | 30 | 3.0 | 37 |

These results show the effects of the TA and PA treatments when used alone on Nylon 66 and cotton samples, as compared to the fabric samples. The samples were tested under a constant heat flux and ignition conditions. The heat release characteristics were measured under flaming combustion conditions, which provides a realistic simulation of fire exposure. The cured fabric achieved PHHR, time to PHRR, THHR, and TSR that exceeded the additive effects expected for the combination of TA and PA coatings based on the TA-treated fabric and PA-treated fabric.

Table 4 shows the added coating weight (%), char length, and after flame time for TA-treated, PA-treated, and untreated samples of Nylon 66 and cotton, TA-treated fabric, PA-treated fabric, and the cured fabric.

TABLE 4

| Sample | Weight add-on | Char length (in.) | After burn time (s) |
|---|---|---|---|
| Untreated Nylon 66 | — | 8 | 17 |
| TA-treated Nylon 66 | 5% | 3 | 1 |
| PA-treated Nylon 66 | 5% | 12 | 40 |
| Untreated Cotton | — | 12 | 12 |
| PA-treated Cotton | 10% | 4 | 0 |
| TA-treated Cotton | 10% | 12 | 27 |
| Untreated fabric | — | 12 | 40 |
| TA-treated fabric | 10% | 12 | 26 |
| PA-treated fabric | 10% | 8 | 0 |
| Cured fabric | 8% | 4.5 | 0 |
| TA/PA dip-coated fabric | 8% | 12 | 22 |
| TA/PA dip-coated fabric | 24% | 4.5 | 0 |

Figure 3:
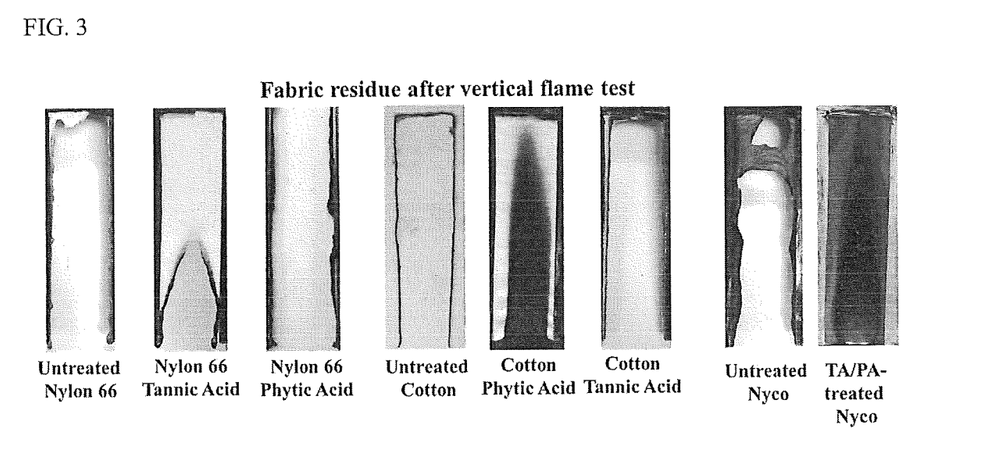
FIG. 3 are photographic images of samples after the vertical flame tests according to one or more aspects described herein.

The results in Table 4 show that treatment with TA reduces char length and after flame time for Nylon 66, whereas PA reduces char length and after burn time for cotton. The results also show that the reduction in char length and after flame time for the cured fabric exceed the decreases expected for the additive combination TA and PA. However, with similar weight add-on (8%), a Nyco fabric sample prepared by dipping in a TA/PA aqueous solution achieved no improvement to char length and minimal improvement to after burn time. Increasing the weight add-on of the dip-coated Nyco fabric sample to 24% was necessary to achieve the flame resistance properties that are comparable to the cure fabric at a weight add-on of only 8%. These results show that simple addition and deposition of TA and PA onto the Nyco fabric can only impart flame resistance with thick coating at significantly high weight add-on. FIG. 3 shows photographic images of the samples after the vertical flame tests.

The tensile properties of the samples are shown in Table 5.

TABLE 5

| Sample | Testing Direction | Force at Break (lbs) | Elongation at Break (inch) |
|---|---|---|---|
| Untreated fabric | Warp | 220 | 1.24 |
|  | Weft | 172 | 1.10 |
| Cured fabric | Warp | 215 | 1.41 |
|  | Weft | 180 | 1.29 |
| Cured fabric (after 5 wash cycles) | Warp | 219 | 1.55 |
|  | Weft | 184 | 1.38 |
| Cured fabric (after 10 wash cycles) | Warp | 213 | 1.49 |
|  | Weft | 177 | 1.30 |

The tear strength properties of the samples are shown in Table 6.

TABLE 6

| Sample | Tear Strength (g) -Width direction- | Tear Strength (g) -Length direction- |
|---|---|---|
| Untreated fabric | 3261 | 3008 |
| Cured fabric | 3290 | 2845 |
| Cured fabric after 1 wash cycle | 3402 | 2467 |
| Cured fabric after 5 wash cycles | 3286 | 2464 |
| Cured fabric after 10 wash cycles | 3267 | 2349 |

As shown in Table 5, the tensile properties of the cured fabric samples were similar after treatment and after multiple wash cycles. The force at break of the untreated fabric did not substantially change after the treatment, while the elongation at break increased about 10% after the treatment. As shown in Table 6, the tear strength in the width direction did not decrease after treatment or after multiple wash cycles. The tear strength in the length direction decreased both after treatment and after successive wash cycles.

The compositions, methods, and articles can alternatively comprise, consist of, or consist essentially of, any appropriate materials, steps, or components herein disclosed. The compositions, methods, and articles can additionally, or alternatively, be formulated so as to be devoid, or substantially free, of any materials (or species), steps, or components, that are otherwise not necessary to the achievement of the function or objectives of the compositions, methods, and articles.

All ranges disclosed herein are inclusive of the endpoints, and the endpoints are independently combinable with each other (e.g., ranges of "up to 25 wt %, or, more specifically, 5 to 20 wt %", is inclusive of the endpoints and all intermediate values of the ranges of "5 to 25 wt %," etc.). The modifier "about" used in connection with a quantity is inclusive of the stated value (e.g., "about 25-50 wt %" is a disclosure of "25-50 wt %") and has the meaning dictated by the context (e.g., includes the degree of error associated with measurement of the particular quantity).

"Combination" is inclusive of blends, mixtures, alloys, reaction products, or the like. The singular forms "a," "an," and "the" include plural referents unless the context clearly dictates otherwise. "Or" means "and/or" unless clearly stated otherwise. The suffix "(s)" is intended to include both the singular and the plural of the term that it modifies, thereby including at least one of that term (e.g., the colorant(s) includes at least one colorants).

Reference throughout the specification to "some embodiments," "an embodiment," and so forth, means that a particular element described in connection with the embodiment is included in at least one embodiment described herein, and may or may not be present in other embodiments. In addition, it is to be understood that the described elements can be combined in any suitable manner in the various embodiments.

Unless defined otherwise, technical, and scientific terms used herein have the same meaning as is commonly understood by one of skill in the art to which this application belongs. All cited patents, patent applications, and other references are incorporated herein by reference in their entirety. However, if a term in the present application contradicts or conflicts with a term in the incorporated reference, the term from the present application takes precedence over the conflicting term from the incorporated reference.

Compounds are described using standard nomenclature. For example, any position not substituted by any indicated group is understood to have its valency filled by a bond as indicated, or a hydrogen atom. A dash ("-") that is not between two letters or symbols is used to indicate a point of attachment for a substituent. For example, —CHO is attached through carbon of the carbonyl group.

As used herein, the term "hydrocarbyl" and "hydrocarbon" refers broadly to a substituent comprising carbon and hydrogen, optionally with 1 to 3 heteroatoms, for example, oxygen, nitrogen, halogen, silicon, sulfur, or a combination comprising at least one of the foregoing; "alkyl" means a branched or straight chain, unsaturated aliphatic hydrocarbon group, e.g., methyl, ethyl, n-propyl, i-propyl, n-butyl, s-butyl, t-butyl, n-pentyl, s-pentyl, and n- and s-hexyl. "Alkenyl" means a straight or branched chain, monovalent hydrocarbon group having at least one carbon-carbon double bond (e.g., ethenyl (—HC=CH$_2$)). "Alkoxy" means an alkyl group that is linked via an oxygen (i.e., alkyl-O—), for example methoxy, ethoxy, and sec-butyloxy groups. "Alkylene" means a straight or branched chain, saturated, divalent aliphatic hydrocarbon group (e.g., methylene ($-CH_2-$) or, propylene ($-(CH_2)_3-$)). "Cycloalkylene" means a divalent cyclic alkylene group, $-C_nH_{2n-x}$, wherein x is the number of hydrogens replaced by cyclization(s). "Alkylidene" means a straight or branched chain, saturated divalent hydrocarbon group, with both valences on a single common carbon atom. "Cycloalkenyl" means a monovalent group having one or more rings and one or more carbon-carbon double bonds in the ring, wherein all ring members are carbon (e.g., cyclopentyl and cyclohexyl). "Aryl" means an aromatic hydrocarbon group containing the specified number of carbon atoms, such as phenyl, tropone, indanyl, or naphthyl. "Arylene" means a divalent aryl group. "Alkylarylene" means an arylene group substituted with an alkyl group. "Arylalkylene" means an alkylene group substituted with an aryl group (e.g., benzyl). "Alkylaryl" means an aryl group that has been substituted with an alkyl group as defined above, with 4-methylphenyl being an exemplary alkylaryl group. "Arylalkyl" means an alkyl group that has been substituted with an aryl group as defined above, with benzyl being an exemplary arylalkyl group. "Acyl" means an alkyl group as defined above with the indicated number of carbon atoms attached through a carbonyl carbon bridge ($-C(=O)-$). "Alkoxy" means an alkyl group as defined above with the indicated number of carbon atoms attached through an oxygen bridge ($-O-$). "Aryloxy" means an aryl group as defined above with the indicated number of carbon atoms attached through an oxygen bridge ($-O-$). The prefix "halo" means a group or compound including one more of a fluoro, chloro, bromo, or iodo substituent. A combination of different halo groups (e.g., bromo and fluoro), or only chloro groups can be present. The prefix "hetero" means that the compound or group includes at least one chain or ring member that is a heteroatom (e.g., 1, 2, or 3 heteroatom(s)), wherein the heteroatom(s) is each independently N, O, S, Si, or P. Unless otherwise indicated, each of the foregoing groups can be unsubstituted or substituted, provided that the substitution does not significantly adversely affect synthesis, stability, or use of the compound. The term "substituted" as used herein means that at least one hydrogen on the designated atom or group is replaced with another group, provided that the designated atom's normal valence is not exceeded. When the substituent is oxo (i.e., =O), then two hydrogens on the atom are replaced. Exemplary groups that can be present on a substituted position include, but are not limited to, nitro ($-NO_2$), cyano ($-CN$), hydroxy ($-OH$), halogen, thiol ($-SH$), thiocyano ($-SCN$), azido; alkanoyl (such as a $C_{2-6}$ alkanoyl group such as acyl); carboxamido; $C_{1-6}$ or $C_{1-3}$ alkyl; $C_{1-6}$ haloalkyl; $C_{5-18}$ cycloalkenyl; $C_{2-6}$ alkenyl; $C_{2-6}$ alkynyl (including groups having at least one unsaturated linkages and from 2 to 6 carbon atoms); $C_{1-6}$ or $C_{1-3}$ alkoxy; $C_{1-6}$ haloalkoxy; $C_{3-12}$ cycloalkyl; $C_{5-18}$ cycloalkenyl; $C_{6-10}$ aryloxy such as phenoxy; $C_{1-6}$ alkylthio; $C_{1-6}$ or $C_{1-3}$ alkylsulfinyl; $C_{1-6}$ or $C_{1-3}$ alkylsulfonyl; aminodi($C_{1-6}$ or $C_{1-3}$)alkyl; $C_{6-12}$ aryl having at least one aromatic rings (e.g., phenyl, biphenyl, naphthyl, or the like, each ring either substituted or unsubstituted aromatic); $C_{7-19}$ arylalkyl having 1 to 3 separate or fused rings and from 6 to 18 ring carbon atoms; or arylalkoxy having 1 to 3 separate or fused rings and from 6 to 18 ring carbon atoms, with benzyloxy being an exemplary arylalkoxy; $C_{7-13}$ arylalkylene (e.g., benzyl); $C_{7-12}$ alkylarylene (e.g., toluyl); $C_{4-12}$ heterocycloalkyl; $C_{3-12}$ heteroaryl; $C_{1-6}$ alkyl sulfonyl ($-S(=O)_2$-alkyl); $C_{6-12}$ arylsulfonyl ($-S(=O)_2$-aryl); or tosyl ($CH_3C_6H_4SO_2-$). When a compound is substituted, the indicated number of carbon atoms is the total number of carbon atoms in the compound or group, including those of any substituents.

While typical aspects have been set forth for the purpose of illustration, the foregoing descriptions should not be deemed to be a limitation on the scope herein. Accordingly, various modifications, adaptations, and alternatives can occur to one skilled in the art without departing from the spirit and scope herein.

What is claimed is:

1. A flame resistant textile, comprising:
   a fiber blend comprising a natural fiber and a synthetic fiber,
   wherein the natural fiber comprises cotton, and
   wherein the synthetic fiber comprises nylon;
   a synergistic flame retardant composition comprising:
   a phenolic compound comprising proanthocyanidin tannic acid;
   a phosphorus-containing compound comprising phytic acid; and
   a surfactant,
   wherein the synergistic flame retardant composition is present in an amount of 0.1 weight percent to about 8 weight percent, based on a total weight of the flame resistant textile, and
   wherein the flame resistant textile has:
   a heat release capacity of less than or equal to 230 joules per gram-Kelvin, as determined by pyrolysis combustion flow calorimetry,
   a total heat release of less than or equal to 11 kilojoules per gram, as determined by pyrolysis combustion flow calorimetry,
   a peak heat release rate of less than or equal to 120 kilowatts per square meter, as determined by cone calorimetry,
   a total heat release rate of less than or equal to 3.5 megajoules per square meter, as determined by cone calorimetry, or
   a combination thereof.

2. The composition of claim 1, further comprising urea or a derivative thereof, a solvent, or a combination thereof.

3. The composition of claim 1, further comprising an additional phosphorous-containing compound, wherein the additional phosphorous-containing compound comprises phosphazene, phosphonitrilic chloride, phosphorus ester amide, phosphoric acid amide, phosphonic acid amide, phosphinic acid amide, thiophosphate, thiophosphonate, thiophosphinate, phosphine oxide, resorcinol bis(diphenyl phosphate), phenyl bis(dodecyl) phosphate, phenyl bis(neopentyl) phosphate, phenyl bis(3,5,5'-trimethylhexyl) phosphate, ethyl diphenyl phosphate, 2-ethylhexyl di(p-tolyl) phosphate, bis(2-ethylhexyl) p-tolyl phosphate, tritolyl phosphate, bis(2-ethylhexyl) phenyl phosphate, tri (nonylphenyl) phosphate, bis(dodecyl) p-tolyl phosphate, dibutyl phenyl phosphate, 2-chloroethyl diphenyl phosphate, p-tolyl bis(2,5,5'-trimethylhexyl) phosphate, 2-ethylhexyl diphenyl phosphate, phosphoric acid, ammonium dihydrogen phosphate, ammonium phosphate, triphosphoric acid, polyphosphoric acid, ammonium polyphosphate, vinyl phosphoric acid, polyvinyl phosphoric acid, vinyl phosphonic acid, polyvinyl phosphonic acid, dimethyl phosphate, diethylphosphinic acid, o-ethyl hydrogen methylphosphonothioate, amifostine, glyphosate, zoledronic acid, or a combination thereof.

4. The flame resistant textile of claim 1, wherein the synthetic fiber and the natural fiber are in the form of a woven fabric, a nonwoven fabric, a knitted fabric, a crocheted fabric, a knotted fabric, an embroidered fabric, a twisted rope, a knitted rope, a braided rope, a crocheted rope, or knotted rope.

5. The flame resistant textile of claim 1, wherein the amount of the synergistic flame retardant composition is 5 weight percent to 8 weight percent, based on the total weight of the textile.

6. The flame resistant textile of claim 1, wherein
the phenolic compound is bonded to the natural fiber, the synthetic fiber, or a combination thereof; and
the phosphorus-containing compound is covalently bonded to the natural fiber, the synthetic fiber, or a combination thereof.

7. The flame resistant textile of claim 1, wherein the phosphorus-containing compound is covalently bonded to the natural fiber by phosphorylation in the presence of an amino compound, wherein the amino compound comprises urea, dicyandiamide, ethylene diamine, or a combination thereof.

8. The flame resistant textile of claim 1, wherein the flame resistant textile has
a heat release capacity of less than or equal to 230 joules per gram-Kelvin, as determined by pyrolysis combustion flow calorimetry; and
a total heat release of less than or equal to 11 kilojoules per gram, as determined by pyrolysis combustion flow calorimetry.

9. The flame resistant textile of claim 1, wherein the flame resistant textile has
a peak heat release rate of less than or equal to 120 kilowatts per square meter, as determined by cone calorimetry, and
a total heat release rate of less than or equal to 3.5 megajoules per square meter, as determined by cone calorimetry.

10. The flame resistant textile of claim 1, wherein the flame resistant textile has a phosphorus content of 3% or less by weight, based on the total weight of the flame resistant textile, as determined by inductively coupled plasma atomic emission spectroscopy.

11. The flame resistant textile of claim 1, wherein the flame resistant textile has
a char yield of 5 to 50 wt %, based on the total weight of the textile, as determined by thermal gravimetric analysis in air at 750° C., and
a char yield of 10 to 50 wt %, based on the total weight of the textile, as determined by thermal gravimetric analysis in nitrogen at 750° C.

12. The flame resistant textile of claim 1, wherein the flame resistant textile has a char length of 20 centimeters or less, as determined according to ASTM D6413.

13. The flame resistant textile of claim 1, wherein a ratio of the natural fiber to the synthetic fiber is 1:2 to 2:1.

14. The flame resistant textile of claim 1, wherein a ratio of the natural fiber to the synthetic fiber is 1:1.5 to 1.5:1.

15. The flame resistant textile of claim 1, wherein the synergistic flame retardant composition is present in an amount of 6 weight percent to 8 weight percent, based on a total weight of the flame resistant textile.

16. The flame resistant textile of claim 1, wherein the synergistic flame retardant composition is present in an amount of 7 weight percent to 8 weight percent, based on a total weight of the flame resistant textile.

17. The flame resistant textile of claim 1, wherein the synergistic flame retardant composition is present in an amount of about 8 weight percent, based on a total weight of the flame resistant textile.

18. A method for the manufacture of the flame resistant textile of claim 1, the method comprising contacting the fiber blend and the flame retardant composition under conditions effective to provide the flame resistant textile.

19. The method of claim 18, wherein the effective conditions comprise curing to provide the flame resistant textile.

20. The method of claim 18, further comprising
contacting the fiber blend and the phenolic compound to form a first coated textile;
contacting the first coated textile and the phosphorus-containing compound to provide a crude textile; and
curing the crude textile under conditions effective to provide the flame resistant textile.

* * * * *